United States Patent [19]

Silitch

[11] 3,761,630

[45] Sept. 25, 1973

[54] UNIDIRECTIONAL COMMUNICATION SYSTEM FOR TWO-WAY COMMUNICATIONS

[75] Inventor: Peter Silitch, Riverdale, Md.

[73] Assignee: United Communications Industries, Inc., Reston, Va.

[22] Filed: Apr. 21, 1971

[21] Appl. No.: 136,130

[52] U.S. Cl. .............................. 179/1 H, 179/15 AL

[51] Int. Cl. .............................................. H04m 9/02

[58] Field of Search ............. 179/1 H, 15 AL, 1 VE, 179/5, 17 B, 28, 30, 33, 17 R, 15 BY; 178/2 D; 340/150, 163, 155

[56] References Cited

UNITED STATES PATENTS

| | | | |
|---|---|---|---|
| 3,632,890 | 1/1972 | Hugenholtz | 179/15 AL |
| 3,601,543 | 8/1971 | Maniere et al. | 179/15 AL |
| 3,384,714 | 5/1968 | Weld et al. | 179/5 R |
| 2,694,802 | 11/1954 | Terry et al. | 179/30 |
| 2,345,912 | 4/1944 | Anspach | 178/2 D |
| 2,177,512 | 10/1939 | Allensworth | 179/5 R |
| 1,142,080 | 6/1915 | Clemons | 179/30 |
| 962,645 | 6/1910 | Livingstone | 179/30 |
| 854,543 | 5/1907 | Terhune et al. | 179/30 |
| 774,608 | 11/1904 | Shackelford | 179/30 |
| 770,556 | 9/1904 | Brown | 179/30 |

*Primary Examiner*—Kathleen H. Claffy
*Assistant Examiner*—Randall P. Myers
*Attorney*—Brady, O'Boyle & Gates

[57] ABSTRACT

A series coupled communication system providing two-way communication between one of a plurality of series connected remote stations or wayside units and a master station while using a one-way signal path or communication link. Communication is initiated by one of the wayside units whereupon the master unit answers and in doing so prevents all other remote stations from breaking in until the master station releases the calling remote station.

14 Claims, 4 Drawing Figures

PETER SILITCH, INVENTOR

BY Brady, O'Boyle & Gates
ATTORNEYS

UNIDIRECTIONAL COMMUNICATION SYSTEM FOR TWO-WAY COMMUNICATIONS

BACKGROUND OF THE INVENTION

1. Field of the Invention

This invention relates to communications systems in general and in more particularity to an intercommunication or telephone system particularly adapted to operate as a highway emergency call-in system to a central office; also to an automatic monitoring system along an extended route such as a pipeline, or to a scattered set of stations all of which are monitored by a single station.

2. Description of the Prior Art

Wayside reporting telephone systems for highways and the like are well known to those skilled in the art, examples of 3,471,649 which are: U.S. Pat. No. 3,128,346 issued to R. P. Dimmer et al.; U.S. Pat. No. 2,156,776 issued to E. L. Roback; and U.S. Pat. No. 3,471,649 issued to W. E. Carle. The Dimmer et al. patent is directed to a party line system including one or more way stations that can connect to one another as well as a telephone exchange. The Roback patent also discloses a party line system with exclusive addressing to any other phone in the system. Finally the Carle patent discloses means for preventing an "off hook" condition of one of the wayside units from causing a complete loss of signalling over the system.

Systems of the "intercom" type which utilize a plurality of interconnected units is disclosed, for example, in the following: U.S. Pat. No. 2,830,127 issued to W. H. Ferguson et al.; U.S. Pat. No. 3,036,163 issued to A. E. Bachlet; and U.S. Pat. No. 3,283,073 issued to R. H. Campbell. The Ferguson patent discloses an intercom system using one line for each station. Each station can be addressed by any other station on its own line and has a line for every other intercom unit attached to it. The Bachelet patent discloses a method of addressing stations on a party line or intercom system using a standard two-way four line system by means of low frequency AC dialing pulses. The Campbell patent, on the other hand, discloses a method of preventing eavesdropping whereby signal transmission exists between calling and call stations in only a single direction while preventing transmission in the reverse direction. This is accomplished by two pairs of oppositely poled parallel connected diodes.

Finally, one further prior art reference is worthy of note and it comprises U.S. Pat. No. 3,364,309 issued to R. Horner. This patent discloses what is commonly referred to as a ring circuit and is comprised of a plurality of series connected amplifiers to provide a conference call circuit for connecting several two wire subscribers where none of the subscriber stations has a right of way or priority over any other subscriber station. This prevents paralleling of many circuits in order to configure a conference call connection and thus avoids overloading and mismatching of the entire system.

SUMMARY

Briefly, the inventive concept of the subject invention is directed to a series coupled system loop for communications whereby unidirectional signal flow is provided around the loop for establishing two-way communications between a master station and a plurality of series coupled remote stations, wherein the output of each station is coupled to the input of the succeeding station. In a first embodiment, a first signal path continuously couples the output of the master station to the input of the first remote station while a second signal path continuously couples the output of the last remote station to the input of the master station. In a second embodiment, a first telephone subscriber "line seizing unit" is coupled to the output of the last remote station and a first telephone subscriber "line answering unit" is coupled to the input of the first remote station. Additionally, a second line answering unit is coupled to the input of the first remote station and a second line seizing unit is coupled to the output of the master station with the respective seizing and line answering units being adapted to intermittently utilize existing subscriber telephone or other lines upon demand to close the communication loop between the master station and the string of series connect-ed remote stations. During a communicating mode of operation, only one remote station can communicate with the master station at any one time and with the communication being initiated from the remote station. When connection is made, however, between the master station and the specific remote station, no other remote station can cut in, eavesdrop, or override the connection and the connection will be maintained until the master station releases the remote station, whereupon the system reverts to a system "standby" mode. In "standby", the same or any other remote station can then alert the master station that it wishes to make connection thereto. The subject invention eliminates the need for two way amplification devices or repeaters since one way signal transmission occurs in a closed loop when connection is made between a remote station and the master station. Such a system is adapted to operate in a fail safe manner with no "off hook" condition possible at the remote stations and no casual false alarms can be communicated to the master station.

DESCRIPTION OF THE PREFERRED EMBODIMENTS

Figure 1:
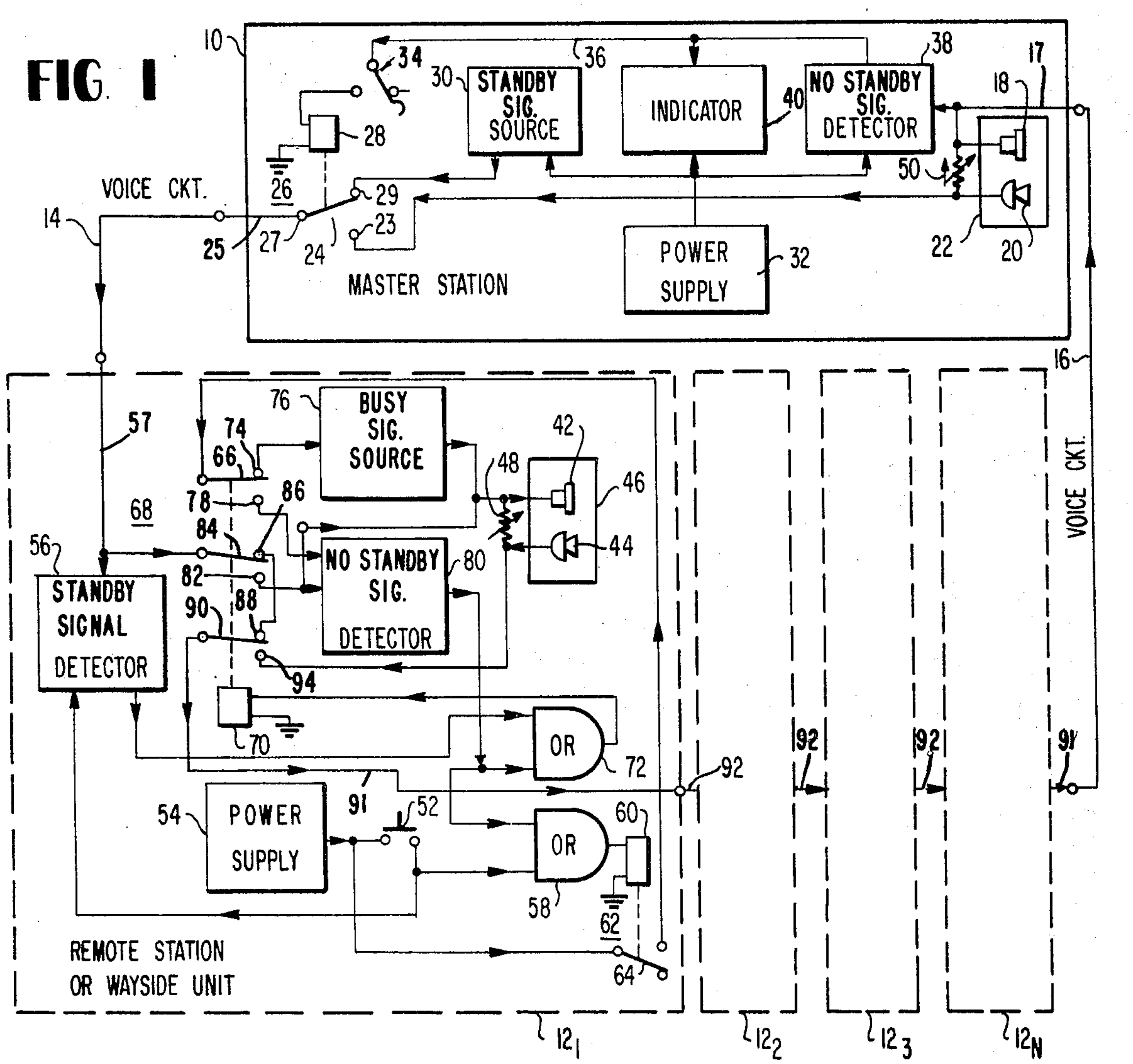
FIG. 1 is an electrical block diagram illustrative of the first embodiment of the subject invention.

Referring now to the drawings wherein like numerals refer to like parts and more particularly to the first and simplest embodiment of the subject invention, reference is made to FIG. 1 wherein reference numeral 10 generally designates a master station or central office depending upon the use intended and wherein reference numerals $\mathbf{12_1}$, $\mathbf{12_2}$, $\mathbf{12_3}$ and $\mathbf{12_n}$ refer to a plurality of series coupled remote stations or wayside units which are coupled to the master station 10 by means of a first signal path or voice circuit 14, which for example comprises a voice frequency single wire pair, coupling the master station 10 to the input of the first remote station $\mathbf{12_1}$. The output of the first remote station $\mathbf{12_1}$ is coupled to the input of the second remote station $\mathbf{12_2}$ and so on until the final or last remote station $12_n$ is reached whereupon the output of the last remote station is coupled back to the master station over a second signal path or voice circuit 16. The combination of the master station 10 and the plurality of series coupled remote stations $12_1...12_n$ and the two voice circuits 14 and 16 provides a normally continuously closed signal circuit when signal flow is constrained to flow unidirectionally counterclockwise around the loop shown in FIG. 1, that is, from left to right through the remote stations $12_1...12_n$ to the master station through voice circuit 16 and from the master station to any and only one remote station over voice circuit 14.

Prior to discussing the operation of the subject embodiment in detail, the various components included in the master station 10 and the plurality of remote stations $12_1$–$12_n$ will now be considered, bearing in mind that all of the remote stations are identical in structure. Considering first the master station 10, it is comprised, inter alia, of receiver means 18 which may be a telephone speaker or other similar audio device and transmitter means 20 which may be, for example, a telephone microphone or other audio transducer. Assuming for sake of illustration that the audio devices 18 and 20 are telephone apparatus, the receiver means 18 may consist of a head set and the transmitter means 20 may consist of a mouthpiece and further, when desirable, may be combined in a teleophone hand set generally illustrated by reference numeral 22. While the present embodiment will be considered for sake of illustration as a telephone system, it should be pointed out that this is not meant to be interpreted in a limiting sense. For example, it will readily become evident that the subject invention is also adapted to embody a simple "intercom" or other similar system.

Continuing further, the receiver means 18 is coupled to one voice circuit 16 by input means 17 while the transmitter means 20 is connected to one of the normally open contacts 23 of a set of relay contacts 24 associated with an electrically operated relay 26 additionally including the solenoid 28. THe movable contact 27 of the set of relay contacts 24 is coupled via separate output means 25 to the other voice circuit 14 while the other normally closed contact 29 is coupled to the output of a signal source 30 continuously powered from a power supply 32. The signal source 30 is adapted to generate any desirable kind of system "standby" signal and may consist of a "ring" signal, an intermittent buzz, a steady tone of either high or low frequnecy, or even a DC signal. All that is required is that the output from the signal source 30 be capable of being sensed by a signal detector which is exclusively responsive to the standby signal to provide no output when the signal is present but a predetermined output when the "standby" signal is not present. The set of relay contacts 24, as well as all those hereinafter referred to, is shown in the deenergized position. THe solenoid 28 is connected to a "hook" switch 34 which is shown in the "on hook" position resulting in the relay 26 being deenergized in the "standby" state or mode. The solenoid 28 is adapted to be connected to an energizing signal line 36 in the "off hook" position of switch 34. The line 36 is coupled to the output of a no standby signal detector 38 whose input is connected to the voice circuit 16 by way of the input means 17. The signal detector 38 is adapted to provide a voltage on signal line 36 capable of energizing a solenoid 28 in the absence of a "standby" signal present on the voice circuit 16. However, in the "standby" mode, a "standby" signal will be coupled to the voice circuit 16 from the standby signal source 30 via relay contacts 24, voice circuit 14 and through all of the remote stations $12_1$–$12_n$ to the voice circuit 16. When a standby signal is present at the input of the signal detector 38, the signal appearing on the line 36 is insufficient to energize the relay coil 28 even when the hook switch is in the "off hook" position. In the event that no "standby" signal appears on voice circuit 16 which is the case when a remote station is trying to reach or make a connection with the master station, as will be explained hereinafter, the signal detector 38 will provide a signal which when an operator at the master station closes the hook switch 34, i.e. goes "of hook", energizes the relay 26 which will then couple the transmitter means 20 to the voice circuit 14. The output of the signal detector 38 is also coupled to a visual or audible indicator 40 for providing an indication that the "standby" signal has disappeared and that a remote station is on the line waiting to be connected to the master station.

Referring now to a typical remote station, for example the station $12_1$, it also includes, inter alia, a telephone receiver 42 and transmitter 44 which may be contained in a hand set 46. An attenuator device 48 is coupled between the receiver 42 and the transmitter 44 for providing a local attenuated side tone which is well accepted practice in the communications art. A similar device 50 is included with the receiver means 18 and the transmitter means 20 contained at the master station 10. The remote station additionally includes a morally open push-button or momentary contact switch 52 which is adapted to be closed by an operator or other means desiring to use the remote station to communicate with the master station. Ths push-button switch 52, when closed, is adapted to couple an energizing or an enabling signal from a power supply 54 to a "standby" signal detector 56 which is coupled to input means 57 and to one input of an OR logic gate 58. The output of the OR gate 58 is connected to the solenoid 60 of a relay 62 which includes a set of relay contacts 64 illustrated in the normally deenergized relay state. The movable contactor of the relay contact 64 is connected to the output of the power supply 54 while the normally open fixed contact is coupled to the movable contact 66 of a second relay 68 which comprises three sets of contacts shown in the deenergized state and being commonly operable by means of a solenoid 70 controlled from the output of a second OR gate 72. The normally closed relay contact 74 associated with the movable contact 66 is coupled to a second signal source 76 which is adapted to provide an output such as a "busy" or "ring" signal when the relay 62 is energized. The normally open relay contact 78 associated with the movable contact 66 of relay 68 is coupled to a standby signal detector circuit 80 which is adapted to be responsive to the signal output from the first signal source 30 in the master station 10. The signal detector 80 is identical to the standby signal detector 38 which provides an output signal only when no "standby" signal is present at its input. The first input to the detector circuit 80 applied from relay contact 78 is merely a power supply potential which when relay 68 is energized will be activated in the event that relay 62 is also activated. A second input is provided to the no "standby" signal detector 80 through the normally open relay contact 82 by the movable relay contact 84 which is directly connected to the voice circuit 14. The relay contact 82 is also connected to the telephone receiver means 42. The normally closed relay contact 86 is directly connected to the normally closed relay contact 88 of a third set of relay contacts assoc-iated with the relay 68. The movable contact 90 associated with the relay contact 88 is directly connected to an output line means 91. THe normally open relay contact 94 of the third set of relay contacts is connected to the telephone transmitter 44. Completing the circuitry, the output of the "standby" signal detector 56 is coupled to one input of the OR circuit 72 while the second input to the OR circuit 72 comprises the output of the no "standby" signal detector 80. The output of the detector 80 is also comprised fo a second input to the OR gate 58.

Having thus described the apparatus contained both in the master station 10 and one of the remote stations $12_1$, the operation of the system can now be considered in detail. In the "standby" state of the system, all of the remote stations $12_1$–$12_n$ have their respective relays 62 and 68 unenergized as shown in FIG. 1 and the relay solenoid 28 contacted in the master station 10 is also unenergizd due to the presence of the "standby" signal from signal source 30 at the input of the detector 38 irrespective of whether the hook switch 34 is open i.e. in an "on hook" state or closed i.e. in an "off hook" state. THe output from the "standby" signal source 30 is coupled through relay contacts 27 and 29 to the voice circuit 14 where it is fed from the input measn 57 through relay contacts 84, 86, 88 and 90 to output means 91 of the first remote station $12_1$. The "standby" signal is translated by means of signal path means 92 to the input means 57 of the second remote station $12_2$ and so forth detector an made" identical fashion through the remainder of the serially connected remote stations $12_3$–$12_n$ where it appears on the second voice circuit 16. The signal appearing on voice circuit 16 is coupled back to the telephone receiver 18 via input means 17 in the master station 10 where it can be heard by an operator, if desired, and also to the input of the signal detector 38 which, due to its operation, provides no output and thus does not energize the indicator 40 nor the solenoid 28 even if the hook switch 34 is closed, i.e. "off hook".

In the event that an operator or other means at a remote station, for example the station $12_1$, desires to communicate with the master station 10, the push-button switch 52 is depressed until the remote station is answered by the master station. Closing the switch 52 energizes the "standby" signal detector 56 which will provide an enabling output to the OR circuit 72 to energize the relay 68. Closing the push-button switch 52 also provides an enabling signal to the OR circuit 58 which energizes the relay 62. The closure of relay contacts 64 applies a power supply signal to the movable contact 66 which immediately energizes no "standby" signal detector 80. The energization of the relay 68, on the other hand, interrupts the unidirectional signal path coupled to the voice circuit 14. This is immediately sensed by the no "standby" signal detector 38 in the master station 10 which energizes the indicator 40 altering the operator at the master station that someone is "on the line". If the operator now closes the hook switch 34, for example by taking the hand set 22 off the hook, relay coil 28 will be energized and the relay contact 27 connects relay contact 23 and the transmitter means 20 to the voice circuit 14. The signal source 80 immediately detects the absence of the "standby" signal normally appearing on the voice circuit 14 and provides an output to the OR circuit 72 which will then continue to energize or hold the relay solenoid 70, at which time the switch 52 can be released without losing the connection.

Upon the energization of the relay 68 in the remote station $12_1$, the transmitter means 20 at the master station 10 which is now connected to the voice circuit 14 through the relay contacts 23 and 27 is coupled to the receiver means 42 through the relay contacts 82 and 84. The transmitter means 44 at the remote station $12_1$, on the other hand, is now connected to the coupling line 92 through the relay contacts 90, 94 and output line 91 to the voice circuit 16 which is coupled back to the receiver 18 at the master station 10. Thus the connection is made and communication can be carried on back and forth between the master station 10 and the remote station $12_1$. This condition will continue until such time that the operator at the master station 10 hangs up on the hook switch 34 or depresses is momentarily thereby deenergizing the relay 26 which again applies the "standby" signal to the voice circuit 14. The detector 80 at the calling remote station senses this causing the relay 68 to become deenergized through the OR circuit 72 which returns the remote station back to its "standby" state. Thus the remote station initiates the connection to the master station; however, after the connection is made, it cannot be broken until it is done so at the master station.

In the event that a second remote unit up or down the line attempts to reach the master staion while any other remote station is already on the line, the pressing of the respective push-button switch 52 by an operator at the attempting station will activate relay 62 applying a supply potential to the relay contact 66; however, the enabling signal applied to the signal detector 56 does not provide an enabling output therefrom to the OR circuit 72 because there is no "standby" signal on the line. Therefore, solenoid 70 will remain deenergized and a feedthrough circuit will nevertheless be maintained through the relay contacts 84, 86, 88 and 90. The second signal source 76 having been energized by the relay 62 will couple a "busy" or "ring" signal, depending on the application, to the transmitter means 42 at the second calling station. The operator at the second remote station must wait until the connected remote station is disconnected before it can make contact with the master station. If more than one remote station attempts to reach the master station before the master answers any one of them, the remote station closest to the master, e.g. station $12_1$, is answered first. While a priority of rank position inherently exists in such a system, it is nevertheless considered to be of little or no detriment if, for example, the system is utilized as a wayside emergency telephone system, where the frequency of calls places is small or in an "intercom" system where the answering of a call by the master station is substantially instantaneous.

While the first embodiment shown in FIG. 1 utilizes a continuously closed signal loop including the voice circuits 14 and 16, it is another object of the present invention to provide a system utilizing the components included in the master station 10 and the plurality of remote stations $12_1$–$12_n$ in combination with subscriber telephone lines or other means which are utilized only upon demand, that is, when a remote station which may be for example a highway or rail wayside unit wishes to communicate with a master station or central office. To this end the second embodiment shown in FIG. 2 is utilized.

Figure 2:
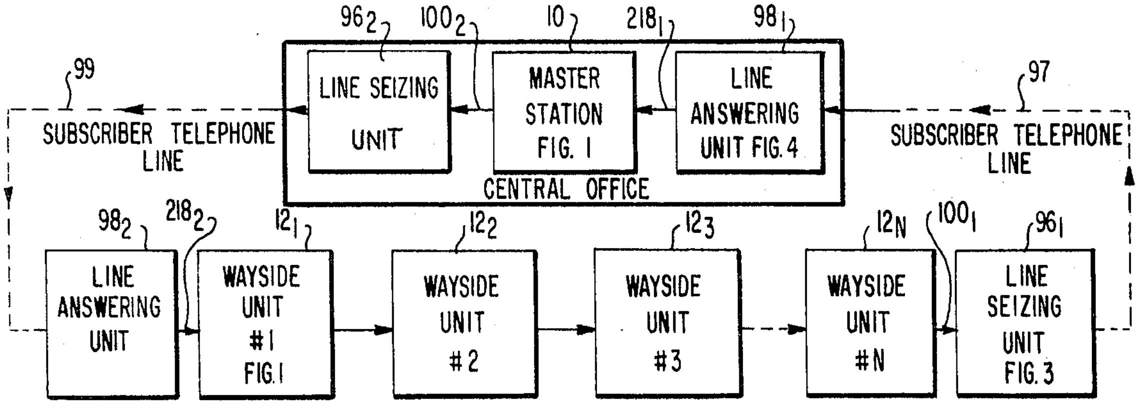
FIG. 2 is a simplified block diagram illustrative of the second embodiment of the subject invention.
Figure 3:
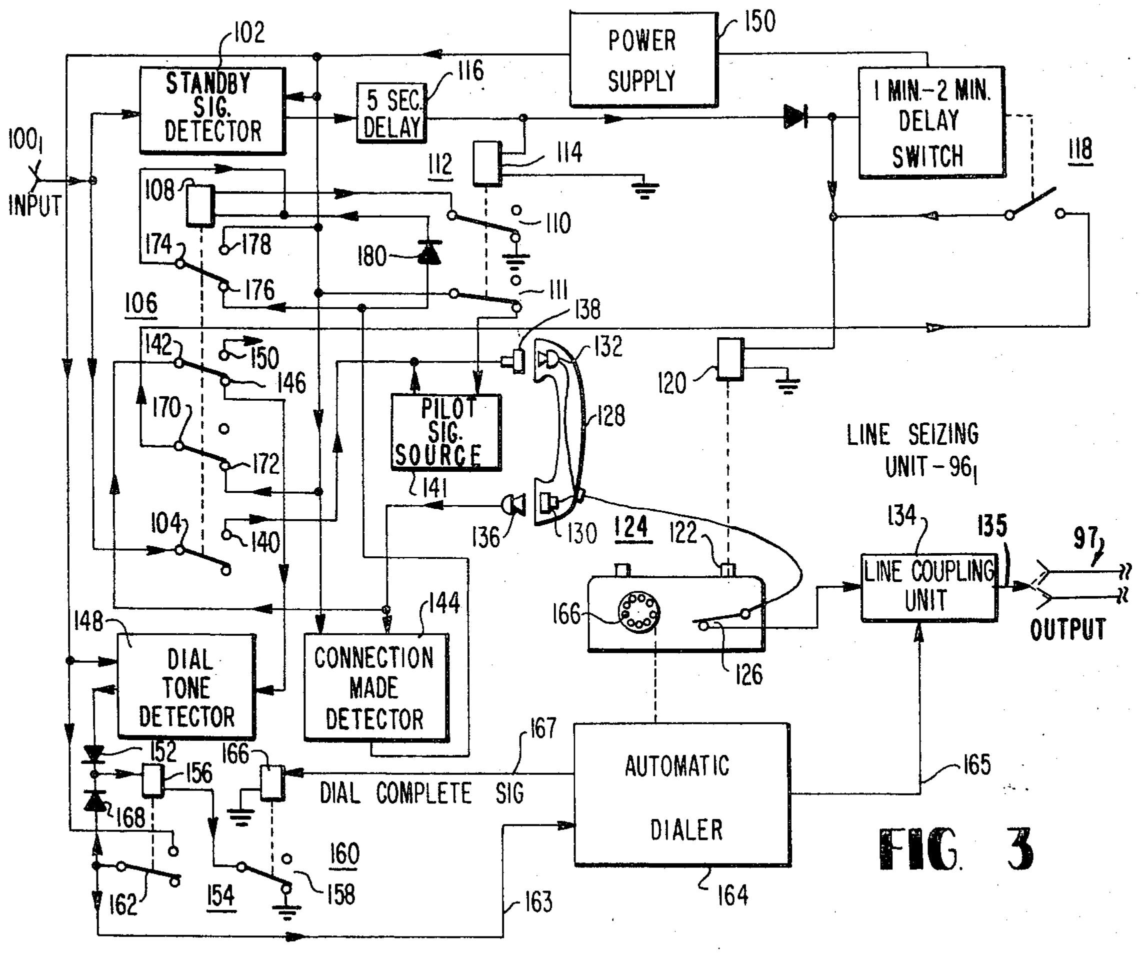
FIG. 3 is an electrical block diagram illustrative of the preferred embodiment of a telephone subscriber line seizing unit included in the second embodiment of the subject invention shown in FIG. 2.
Figure 4:
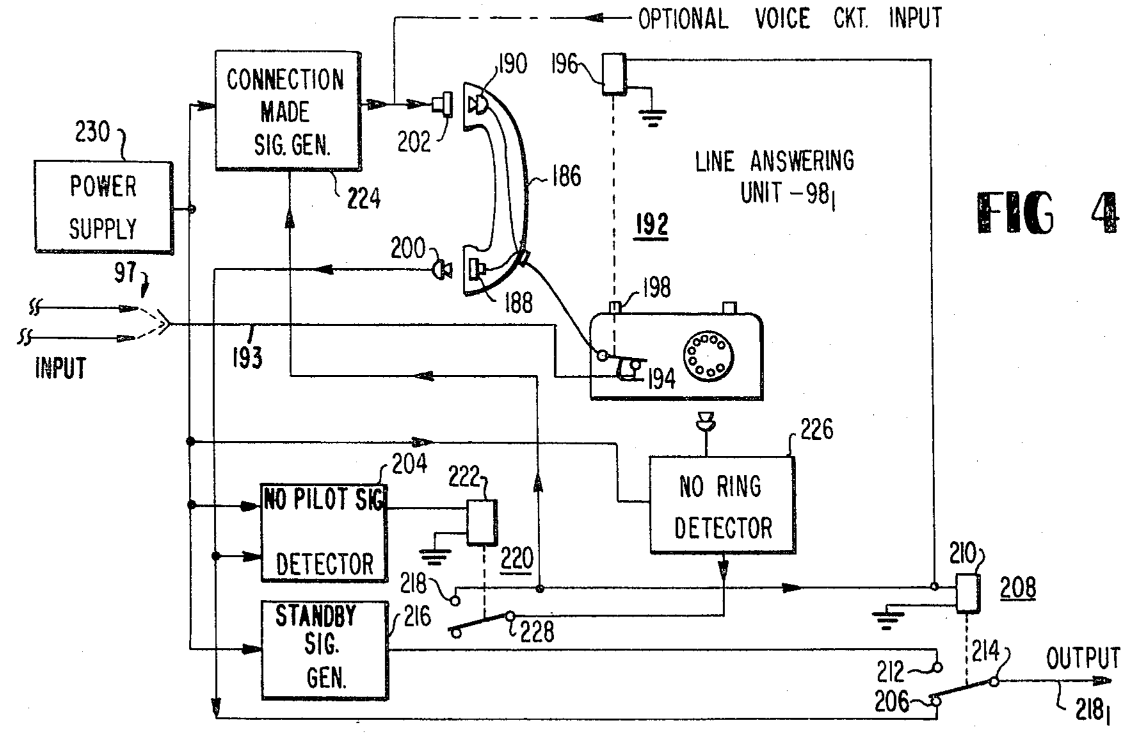
FIG. 4 is an electrical block diagram of a telephone subscriber line answering unit included in the second embodiment of the subject invention shown in FIG. 2.

Referring now to FIG. 2, a plurality of series connected remote stations or wayside units $12_1$, $12_2$, $12_3$ and $12_n$ as shown in FIG. 1 are again included. At the output of the last wayside unit $12_n$, however, is connected a first signal path or telephone line seizing unit $96_1$, which is adapted to seize any available signal path such as a subscriber telephone line 97 and automatically dial a telephone set, not shown, in a first signal path or line answering unit $98_1$, contained at the central office. When a connection is made between the two, the line answering unit $98_1$, couples to master station 10 apparatus shown in FIG. 1 which in turn couples to a second line seizing unit $96_2$ also located at the central office which seizes another available subscriber telephone line 99 and automatically connects to a telephone set, not shown, in a second line answering unit $98_2$ which couples the seized telephone line 99 to the first wayside unit $12_1$. The embodiments of the line seizing units $96_1$ and $96_2$ are identical and are shown in FIG. 3. The line answering units $98_1$ and $98_2$ are also identical and are shown in FIG. 4.

Considering first the preferred embodiment of a line seizing unit for example unit $96_1$, bearing in mind that the second line seizing unit $96_2$ is identical, reference is made to FIG. 3 wherein input line $100_1$ is adapted to be connected to an output line 91 (FIG. 1) from the last wayside unit $12_n$. The input line $100_1$ is commonly fed to the input of a signal detector 102 which is similar to the signal detector 56 shown in FIG. 1 in that it is responsive to the same "standby" signal and is operable to provide an output only when the "standby" signal is present. The other input is fed to movable relay contact 104 of a four contact set relay 106. Relay 106 includes also a solenoid 108 which has its ground return lead coupled through relay contacts 110 of relay 112. Relay 112 has its solenoid 114 coupled to the output of the standby signal detector 102 through a five second time delay circuit 116 which is also coupled to a 1 to 2 minute time delay switch circuit 118 which is adapted to operate after said delay in the event that no output is provided from the signal detector 102 during this time delay (1–2 minutes). The purpose of this will be explained subsequently. Additionally, the output of the five second delay circuit 116 is coupled to the solenoid 120 of a telephone actuating device which is adapted to actuate the "hook" or "cradle" plunger 122 of a standard telephone set 124 when energized to cause the phone to be "on hook" which consists in opening the switch contacts 126 connecting the hand set 128 including the receiver 130 and transmitter 132 to an outside telephone line coupling unit 134. The receiver 130 and transmitter 132 are placed adjacent a second transmitter 136 and a second receiver 138, respectively, which may be located in a suitable casing or other apparatus, not shown, when the telephone hand set 128 is normally placed therein. THe normally open relay contact 140 associated with the movable contact 104 is directly connected to the receiver 138 while the transmitter 136 is connected to the movable contact 142 of a second set of relay contacts associated with the relay 106. The transmitter 136, moreover, is connected to the input of a "connection made" detector 144 which will be discussed subsequently. Additionally, a third or "pilot signal" source 141 has its output connected to the receiver 138 and is adapted to be selectively energized by a power supply voltage applied through the relay contacts 111.

The normally closed relay contact 146 associated with the movable contact 142 is connected into a telephone "dial tone" detector circuit 148 while the normally open contact 150 is unconnected but may be utilized as an optional voice circuit output when desired. The "dial tone" detector 148 is adapted to be powered by means of a power supply 150 and has its output connected through a semiconductor diode 152 to the relay 154 whose solenoid 156 has its ground return coupled through a normally closed set of relay contacts 158 associated with a third relay 160. The set of relay contacts 162 associated with the relay 154 are adapted to couple a supply potential via circuit lead 163 when the relay is energized to an automatic telephone dialer mechanism 164 for initiating operation thereof. Automatic dialing mechanisms are well known to those skilled in the art, an example of which is disclosed in U.S. Pat. No. 2,579,983 issued to M. E. Thornton on Dec. 25, 1951 and presently being in the public domain. The automatic dialing mechanism is adapted to operate a rotary dialer 166 associated with the telephone set 124. It should also be pointed out that the automatic dialer 164 is also adapted to produce an electrical signal output on circuit lead 165 corresponding to the digits of the number to be dialed and which can be directly coupled to the subscriber's line 97 by means of the line coupling unit 134 and output line means 135. Although a rotary dialer is disclosed and the automatic dialing mechanism 164 being of the type for actuating a rotary dial telephone as well as the line coupling unit therefor, it should be noted that when desirable a push-button telephone set may be substituted without departing from the scope of the invention and the automatic dialing apparatus modified accordingly.

The automatic dialer mechanism 164 has an output coupled therefrom to the solenoid 166 of the relay 160 by means of circuit lead 167 which is adapted to energize this relay when the dialing operation is complete, thereby removing the ground connection for the solenoid 156 of relay 154. A second semiconductor diode 168 is coupled between the contacts 162 and the solenoid 156 for providing a holding circuit for the relay solenoid 156 after it is energized by means of the dial tone detector 148 through the diode 152.

A third set of relay contacts of the relay 106 including the movable contact 170 and the normally closed contact 172 couples a supply potential to the switch 118 which when closed will energize the solenoid 120. This is an automatic hang up provision which will be explained subsequently. The fourth set of relay contacts associated wtih the relay 106 comprises a set of relay holding contacts wherein the movable contact 174 and thus the solenoid 108 is coupled to the "connection made" detector 144 output through the normally closed contact 176. The normally opened contact 178 is connected to the output of the power supply 150. The output of the "connection made" detector 144 is also coupled to the solenoid 108 by means of the semi-conductor diode 180.

Prior to discussing the operation of the line seizing unit 96, shown in FIG. 3, the associated line answering unit $98_1$, shown in FIG. 1, will be considered with respect to its components and the operation of the two units will then be considered together since operation of one depends upon the operation of the other. Considering now FIG. 4, the external subscriber telephone line 97 is connected to a standard telephone set 192 including hand set 186 by means of input line means 193. The telephone hand set 186 includes a receiver 188 and a transmitter 190 which are connected to the line input line means 193 through a plunger actuated connection switch 194. The switch 194 corresponds to a telephone "hook" or "cradle" switch and is adapted to be operated by a solenoid 196 which, when energized, depressed a plunger mechanism 198 to open the switch 194. That is, when the solenoid 196 is energized, the telephone set 192 is in a "hung up" state even though the hand set 186 is lifted off of the plunger mechanism 198. Adjacent the receiver 188 and the transmitter 190 is another transmitter 200 and receiver 202, respectively. The transmitter 200 is audibly coupled to the reciver 188 and is electrically coupled to a no "pilot tone" signal detector circuit 204 which is responsive to the signal generated by the third signal source 141 in the line seizing unit 96 (FIG. 3) which, as noted above, consitutes a "pilot tone" signal. However, the detector 204 is adapted to operate inversely, that is, it will provide no output signal while a "pilot tone" signal is received, but will provide an output signal when no "pilot tone" signal is received. The transmitter 200 is also connected to a normally closed fixed relay contact 206 of the relay 208 which includes a solenoid 210, a normally open relay contact 212 and a movable contact 214. THe normally open contact 212 is coupled to the output of a signal generator 216 which is adapted to produce a signal identical to the output of the first signal source 30 in the master station 10, that is, a "standby" signal. The movable contact 214, on the other hand, is directly connected to an output line 218, which is adapted to be connected to the input of the master station 10 which is common to the receiver means 18 and the signal detector 38 shown in FIG. 1.

The solenoid 210 of the relay 208 is coupled to a normally open relay contact 218 of a relay 220 which includes a solenoid 222 connected to the output of the signal detector 204 and is adapted to be energized thereby. Relay contact 218 is also connected to the solenoid 196 and to a "connection made" signal generator 224. The signal generator 224 is disabled when a signal appears at relay terminal 218 from a "no ring" detector 226 which produces a voltage on the movable contact 228 of relay 220 while there is no ringing of the telephone set 192. However, in the event that there is a "ring" signal at the telephone set 192, no output would be provided to relay contact 228. Therefore when the telephone set 192 is idle and no "pilot tone" signal is detected by the detector 204, relay 220 is energized making the relay contacts 218 and 228 whereupon a deenergizing signal is coupled to the "connection made" signal generator 224 as well as energizing the solenoids 210 and 196 causing relay contacts 212 and 214 to be closed and the plunger 198 depressed, respectively, rendering the telephone set 192 in a "on hook" state. Finally, a power supply 230 is adapted to continuously supply electrical power to the signal generators 216 and 224 as well as the two detectors 204 and 226.

Considering now the operation of the line seizing units $96_1$ and $96_2$ and the line answering units $98_1$ and $98_2$ in relation to the embodiment of the invention shown in FIG. 2, keeping in mind that both pairs of like units operate in an identical manner, consider first the series coupled wayside string including the wayside units $12_1$–$12_n$ and the line seizing unit $96_1$ connected to the last wayside unit $12_n$ and the line answering unit $98_2$ connected to the first wayside unit $12_1$. It should be observed also that all of the varoius units contain their own power supply and that there is no continuous connection to the central office over the subscriber telephone lines 97 and 99. The line answering unit $98_2$ will not be receiving a "pilot tone" signal from the central station's line seizing unit $96_2$ because there is no connection thereto; therefore, the no "pilot tone" signal detector 204 such as shown in FIG. 4 will provide an output energizing the relay 220 closing the relay contacts 218 and 228. Secondly, since the telephone set 192 is not ringing, the output of the detector 226 will energize relay 208 and the solenoid 196. Energizing relay 208 couples a "standby" signal produced by the signal generator 216 to the output line $218_2$. This signal will be transferred through all the wayside units $12_1$–$12_n$ to the input line $100_1$ of the line seizing unit $96_1$. The signal detector 102 therein responds to the "standby" signal generated by signal generator 216 located at the line answering unit $98_2$ producing an output and after a 5 second delay, energizes relay 112 opening the normally closed set of relay contacts 110 and 111 which in turn prevents the solenoid 108 of relay 106 from being energized as well as removing power supply potential from signal source 141. At the same time the solenoid 120 in the line seizing unit 96 is energized causing the plunger 122 of the telephone set 124 to be depressed, placing telephone set "on hook". Therefore, bot telephone units 192 and 124 in the line answering unit $98_2$ and the line seizing unit $96_1$, respectively, are in a "on hook" state.

In the event that one of the wayside units $12_1$–$12_n$ desires to contact the central office, the push-button 52 shown in FIG. 1 is depressed, which causes a circuit interruption between relay contact 84 and the output line 92 (FIG. 1). When this happens, the output of the signal detector 102 in the line seizing unit $96_1$ disappears whereupon relay 112 and solenoid 120 become deenergized. Switch contacts 126 in the telephone set 124 close (the telephone set is put in an "off hook" state) and a "dial tone" provided by the external subscriber telephone system appears at the receiver 130 of the hand set 128. This "dial tone" is coupled to the transmitter 136 and is fed to the "dial tone" detector 148 through the relay contacts 142 and 146. The "dial tone" detector immediately energizes relay 154 which is subsequently held by diode 168 and a power supply potential is applied to the automatic dialer 164 via circuit lead 163 which proveeds to dial the telephone number of the telephone set 192 contained in the line answering unit $98_1$ located at the central office. When the dialing is completed, relay 160 in the line seizing unit $96_1$ is energized which in turn deenergizes relay 154 removing power from the automatic dialer 164.

When the telephone set 192 of the line answering unit $98_1$ "rings", the output of the detector 226 disappears causing relay 208 and solenoid 196 to become deenergized. This immediately closes the contacts 194 in the telephone set 192 (putting the telephone set in an "off hook" condition) connecting the subscriber line 97 to the hand set 186. Also, the transmitter 200 which is audibly connected to the receiver 188 is connected to output line $218_1$. A "pilot tone" from signal generator 141 in the line seizing unit $96_1$ is detected by the detector 204 whereupon relay 220 becomes deenergized, opening the contacts 218 and 228. This will keep relay 208 and the solenoid 196 deenergized, making a signal path between the input subscriber's line 97 and the output line $218_1$. The "connection made" signal generator 224 is enabled by the removal of the input from relay terminal 218 and a signal is coupled back to the line seizing unit $96_1$ by means of the receiver 202 and the transmitter 190 and the hand set 186 at the line answering unit $98_1$. This signal is translated to the hand set 128 and then to the connection made detector 144 which operates to energize the relay 106. Energizing relay 106 causes relay contacts 104 and 140 to make connection whereupon the complete signal path is made from input terminal $100_1$ of the line seizing unit $96_1$ to the output terminal $218_1$ of the line answering unit $98_1$.

It should also be noted that energizing the relay 106 causes relay contacts 170 and 172 to open which effects removal of the power supply voltage from the 1 to 2 minute delay switch 118. This in effect deactivates the automatic "hang up" circuitry which includes the 1 to 2 minute delay switch 118.

When the line answering unit $98_1$ couples transmitter 200 to the central unit 10 and more particularly to the receiver 18 and the signal detector 38, the detector 38 immediately senses the absence of the "standby" signal generated by the signal generator 216 in the line answering unit $98_1$. The indicator 40 at the central station 10 will be activated alerting the operator that a wayside unit is "on the line". The line seizing unit $96_2$, meanwhile, is deactivated due to the presence of the "standby" signal from the source 30 coupled thereto. However, when the operator at the central office closes the hook switch 34, the line seizing unit $96_2$ immediately seizes a subscriber line 99 and dials the telephone number of the line answering unit $98_2$ in the same manner previously described for unit $96_1$. When the line answering unit $98_2$ has made a connection with the line seizing unit $96_2$, the telephone transmitter 20 in the master station 10 located at the central office will be connected through relay contacts 82 and 84 of relay 68 of the wayside unit to its associated receiver 42 while the respective transmitter 44 is connected by means of relay contacts 90 and 94 back to the receiver 18.

The interconnection, however, has been accomplished by means of two separate subscriber telephone line links 97 and 99 seized on demand by two line seizing and line answering unit pairs. Because of the manner in which the connection is made, any fault in the wayside unit string is brought to the immediate attention of the central office. This is effected by the inverse logic built into the system. As in the case of the first embodiment, the central office can immediately terminate communications with the wayside unit presently on the line at will by opening switch 34 which will restore the system to a "standby" state whereby all of the telephone sets in the respective line seizing and line answering units will be hung up after a five second delay caused by the action delay circuit 116. When this occurs, any other or the same wayside unit can then again intitiate a call back to the central station, and if a call is initiated before the five second delay elapses, as it would if a caller was waiting, the delay of remaking the subscriber's connections is avoided and the new connection is made immediately. However, again it ought to be emphasized that only one wayside unit at a time can communicate with the master station with all other wayside units being blocked and being incapable of breaking in or eavesdropping on the conversation once the loop circuit has been completed or closed.

The terms and expressions which have been employed herein are used as terms of description and not Of limitation, and there is no intention, in the use of such terms and expressions, of excluding any equivalents of the features shown and described or portions thereof but it is recognized that various modifications are possible within the scope of the invention claimed.

I claim as my invention:

1. A two way communications system comprising in combination:

a master station (10);

a plurality of remote stations (12);

means (14) and (16) for selectively coupling said plurality of remote stations in a unidirectional signal flow series loop circuit to the master station whereby the output of said master station is coupled to the input of the first of said plurality of remote stations, the input of said master station is coupled to the output of the last of said plurality of remote stations and means (92) coupling the output of each of said plurality of remote stations to the input of the respective succeeding remote station;

said master station comprising, separate input and output means (17) and (25), communication signal receiver means (18) coupled to said input means (17), communication signal transmitter means (20), a system standby signal source (30) generating a standby signal, control signal operated switch means (26) coupling said standby signal source (30) to said output means (25) in a system "standby" mode of operation whereby said standby signal is translated through said series loop circuit in a unidirectional signal flow path back to said input means (17), standby signal detector circuit means (38) coupled from said input means (17) to said switch means (26), being operable in absence of said standby signal to provide a control signal to said switch means which operates to disconnect said standby signal source (30) from said output means (25) and then connect said communications signal transmitter means (20) to said output means (25) in a "communicating" mode of operation, and circuit interrupter means (34) coupled between said detector circuit means (38) and said control signal operated switch (26) for selectively interrupting said control signal thereby recoupling said signal source (30) to said output means (25) and decoupling said transmitter means (20) from said output means (25) returning said system to said "standby" mode thereby; and wherein each of said remote stations (12) comprises, separate input and output means (57) and (91), communications signal receiver means (42), and communications signal transmitter means (44), electrically operated switch means (68) for maintaining a normally uninterrupted unidirectional signal flow path between said input means (57) and said output means (91) during said "standby" mode, actuator switch means (52) for selectively interrupting said signal path to initiate said "communicating" mode, standby signal detector means (56) coupled to said input means (57) and being rendered operative by operation of said actuator switch means (52), and being responsive to said standby signal generated by said signal source (30) in said master station to produce a control signal, said electrically operated switch means (68) being operable in response to said control signal from said second detector means (56) to respectively couple said communications signal receiver means (42) to said input means (57) and said transmitter means (44) to said output means (91).

2. The system as defined by claim 1 wherein respective communications signal receiver means (18) and (42) and communications signal transmitter means (20) and (44) comprise voice communications means.

3. The invention as defined by claim 2 wherein said means (14) and (16) for selectively coupling said plurality of remote stations (12) to the master station (10) comprises a continuous unidirectional voice communications signal path loop.

4. The system as defined by claim 1 wherein said means for selectively coupling said plurality of remote stations ($12_1$ ... $12_n$) to the master station (10) comprises a first signal path seizing unit ($96_2$) coupled to the output of said master station (10), a first signal path answering unit ($98_2$) coupled to the input of said first remote station ($12_1$), said first signal path seizing unit ($96_2$) being operable to seize a first communications signal transmission path (99) upon demand and connect it to said first signal path answering unit ($98_2$), a second signal path seizing unit ($96_1$) coupled to the output of said last remote station ($12_n$), a second signal path answering unit ($98_1$) coupled to the input of said master station (10), said second signal path seizing unit ($96_1$) being operable to seize a second communications signal transmission path (97) on demand and connect it to said second signal path answering unit ($98_1$).

5. The system as defined by claim 4 wherein said first and second communications signal transmission path comprises subscriber telephone lines.

6. The system as defined by claim 5, wherein said first and second signal path seizing units and said first and second signal path answering units are comprised of telephone line seizing and answering devices respectively.

7. The invention as defined by claim 1 wherein said means for selectively coupling said plurality of remote stations (12) to the master station (10) comprises at least one intermittently closed communications link (16) or (14) which is seized and closed upon demand.

8. The invention as defined by claim 7 wherein said communications link additionally includes a signal path seizing unit (96) and a signal path answering unit (98).

9. The invention as defined by claim 8 wherein said signal path seizing unit (96) comprises:

input means (100) and output means (135);

standby signal detector means (102) coupled to said input means (100), being responsive to an externally generated standby signal and being operable to provide an output control signal only when said standby signal is present at said input means (100);

first audio signal translation means (138) and (132) and second audio signal translation means (136) and (130) adapted to be coupled to a communication link (97) for translating output and input audio signals, respectively, to and from said communications link;

circuit means (124) coupled between said first and second signal translation means and said communications link, being operable to selectively couple said first and second signal translation means to said communications link;

means (120) coupled to said standby signal detector means (102) and said circuit means (124), being responsive to the output signal from said detector means (102) to render said circuit means inoperative when said input signal to said input means (100) is present but rendering said circuit means (124) operative when said input signal is absent to couple said first and second signal translation means to said communications link (97) by way of said output means (135);

a second signal generator (141) having its output coupled to said first signal translation means (138) and (132) and including means for being normally inoperative but becoming operative in absence of said externally generated standby input signal to said standby signal detector means (102) to provide a predetermined output signal to said first signal translation means (128) and (132);

signal detector means (148) and (144) each having an input coupled to said second signal translation means (136) and (130), being adapted to receive a second type input signal and a third type input signal, respectively, from said communications link when said circuit means (124) is rendered operative;

external communications unit address means (164) having its output coupled to said output means (135) and having its input coupled to said signal detector means (148), and being activated by a control signal therefrom when said second type input signal is received to address said signal path answering unit (98) and transmit an address or ring signal thereto; and circuit means (106) being operable to couple said first audio signal translation means (138) and (132) to said input means (100) in response to a control signal from said signal detector means (144) upon receiving said third type input signal indicative of a completed connection to said external communications unit (98) and further indicative of the readiness of said external communications link (97) to accept an address signal and operably decoupling said first signal translation means when said standby input signal to said standby signal detector (102) is reapplied.

10. The invention as defined by claim 9 wherein said signal path answering unit (98) comprises:

input means (193) and output means (218), and wherein said input means (193) is coupled to said communications link (97);

third audio signal translation means (202) and (190) and fourth signal translation means (200) and (188) adapted to be coupled to said communications link (97) for translating input and output audio signals, respectively, from and to said communications link (97);

communications circuit means (192) having audible address means, coupled between said third and fourth signal translation means and said communications link (97) and being operable to selectively couple said third and fourth signal translation means to said communications link;

a third signal generator (224) coupled to said third signal translation means (202) and (190) coupling a selected signal thereto when energized but adapted to be normally deener-gized and becoming energized when said communications circuit means (192) is addressed from said line seizing unit (96) by an address signal over said communications link (97);

an address signal detector (226) audibly coupled to said communications circuit means (192) being operative to provide an output signal in absence of said address signal but providing no output signal when said address signal is applied to said input means (193), another signal detector means (204) coupled to said fourth signal translation means (200), being responsive to said predetermined signal generated by said second signal generator (141) in said seizing unit (96) and coupled thereto from said external communications link (97) and being operable to provide a control signal only in absence of said predetermined signal;

a standby signal generator (216) generating an output signal substantially like said standby generated by said signal source (30) in said master unit (10);

circuit means (220) responsive to said control signal from said another detector (204), being operable to couple the output signal of said address signal detector (226) to said third signal generator (224) generating said selected signal, thereby providing a disabling signal therefor and to said communications circuit means (192) for rendering said communications circuit means (192) inoperative when no address or ring signal is present; and circuit means (208) coupled to said immediately preceding recited means (220), being coupled to said address signal detector (226) thereby and being responsive to the output thereof to selectively couple the output of said standby signal generator (216) to said output means (218) when said communications circuit means (192) is not receiving said address signal but coupling said fourth signal translation means (200) and the input of said another signal detector (204) to said output means (218) when said communications circuit means (192) has received an audible address signal and is continuing to receive said predetermined signal from said signal path seizing unit (96) and decoupling said fourth signal translation means (200) in absence of said predetermined signal.

11. The invention as defined by claim 8 wherein said signal path seizing unit (96) comprises:

input means (100) and output means (135);

standby signal detector means (102) coupled to said input means (100) being responsive to an input signal corresponding to a standby signal source in said master station and being operable to provide a control output signal only when said standby signal is coupled to said input means (100);

a telephone set (124) including an audio transmitter (132), an audio receiver (130), and a switch (126) for selectively coupling said transmitter and receiver to said output means (135);

line coupling means (134) coupling said switch means (126) to an external communications link (97) via said output means (135);

switch actuator means (120) coupled to said standby signal detector means (102), being responsive to the output signal therefrom to open said telephone switch (126) when said standby signal to said input means (100) is present but closing said telephone switch (126) when said standby signal is absent and thereby coupling said telephone transmitter (132) and receiver (130) to said communications link (97) by way of said output means (135);

local receiver means (138) located in proximity to said telephone transmitter (132) and being adapted to receive audio signals therefrom;

local transmitter means (136) located in proximity to said telephone receiver (130), said transmitter means (136) being adapted to couple audio signals thereto;

a pilot signal generator (141) coupled to said local receiver means (138) and including means (111) for being normally inoperative but becoming operative in absence of said standby signal to said standby signal detector means (102) to provide a pilot signal output to said local receiver means (138);

dial tone detector means (148) and connection made signal dtector means (144) each having an input coupled to said local transmitter means (136), being adapted to receive a "dial tone" type input signal and a "connection made' type input signal, respectively, from said communication link (97) when said telephone switch (126) is closed;

automatic telephone dialer apparatus (164) having its input coupled to said dial tone signal detector means (148), being activated by a control signal therefrom when said dial tone type input signal is received to dial an external telephone set (192) via said communication link (97); and switch means (106) being operable to couple said local receiver means (138) to said input means (100) in response to a control signal from said connection made detector means (144) upon receiving said "connection made" type input signal indicative of a completed connection to said external telephone set and further indicative of the readiness of said external communications link (97) to accept dialing signals and thereafter decoupling said local receiver means (138) when said standby signal to said standby signal detector (102) is reapplied.

12. The invention as defined by claim 7 wherein said communications link (97) comprises subscriber telephone line means.

13. The invention as defined by claim 8 wherein said signal path answering unit (98) comprises:

input means (193) and output means (218), and wherein said answering unit input means (193) is coupled to an external communications link (97);

a telephone set (192) including an audio transmitter (190), an audio receiver (188), and a switch (194) for selectively coupling said telephone transmitter (190) and receiver (188) to said answering unit input means (193);

switch actuator means (196) coupled to said telephone set switch (194) for operating said switch from an open position to a closed position in response to a control signal applied thereto;

local transmitter means (200) located in proximity to said telephone receiver (188) and adapted to couple audio signals thereto;

local receiver means (202) located in proximity to said telephone transmitter (190) and being adapted to receive audio signals therefrom;

a connection made signal generator (224) coupled to said receiver means (202) coupling a connection made signal thereto when energized but adapted to be normally deenergized and becoming energized when said telephone set receives a calling or ring signal from said line seizing unit (96);

a calling or ring signal detector (226) coupled to said telephone set (192), being operative to provide a control output signal in absence of a calling signal but providing no control output signal when a calling or ring signal is received;

a pilot signal detector (204) adapted to be responsive to a pilot signal coupled thereto from said external communications link (97) and being adapted to provide an output signal only in absence of said pilot signal;

a standby signal generator generating a standby output signal substantially like said standby signal generated by said standby signal source (30) in said master unit;

switch means (220) responsive to the control signal generated by said pilot signal detector (204), being operable to couple the control output signal of said calling signal or ring detector (226) to said connection made signal generator (224) generating said "connection made" signal, thereby providing a disabling signal therefor, and to said operator means (196) for operating said telephone switch (194) to open said switch when no calling signal is present indicative of a "no ring" condition;

and switch means (208) coupled to said switch means (220); being coupled to said calling or ring signal detector (226) thereby and being responsive to the control signal output thereof to couple the output of said standby signal generator (216) to said output means (218) when said telephone set (192) is in a "no ring" condition but coupling said local transmitter means (200) and the input of said pilot signal detector (204) to said output means (218) when said telephone set (192) has received a calling signal and is continuing to receive a pilot signal from said signal path seizing unit (96) and decoupling said local transmitter means (200) in absence of said pilot signal.

14. The invention as defined by claim 1 wherein said signal source (30) in said master unit (10) generates a "standby" signal, and wherein said signal path seizing unit (96) comprises: input means (100) and output means (135);

a "standby" signal detector (102) coupled to said input means (100) being responsive to an externally generated "standby" signal to provide control signal only when said "standby" signal is coupled thereto;

a first telephone set (124) including a transmitter (132), a receiver (130) and a switch (126) for selectively coupling said first telephone set transmitter (132) and receiver (130) to said output means (135);

coupler means (134) adapted to couple said first telephone set (124) to a subscriber telephone line (97) upon demand;

solenoid actuator means (120) coupled to said "standby" signal detector (102), being responsive to said control signal therefrom to open said first telephone set switch (126) when said "standby" signal is present at the input of said "standby" signal detector (102) but closing said telephone switch when said "standby" signal is absent for coupling said first telephone set transmitter (132) and receiver (130) to said subscriber telephone line;

receiver and transmitter means (138) and (136) respectively adapted to be coupled to said first telephone set transmitter (132) and receiver (130);

a "pilot tone" signal generator (141) coupled to said receiver means (139), begin inoperative when said "standby" signal is coupled to said "standby" signal detector (102) but becoming operative to provide a "pilot tone" Signal coupled to said telephone transmitter (132) in absence of said "standby" signal;

a "dial tone" signal detector (148) and a "connection made" signal detector (144) both coupled by means of their respective inputs to said transmitter means (136) and being adapted to receive "dial tone" and "connection made" input signals, respectively, therefrom when said first telephone set switch (126) is closed;

automatic telephone dialer apparatus (164) selectively coupled to said first telephone set (126) and said coupler means (134), and additionally including means for being coupled to the output of said "dial tone" detector (148) and being energized by an output signal therefrom when a "dial tone" signal is received by said first telephone set receiver means (130) and coupled to said transmitter means (136) to dial an external telephone set (192) in a signal path answering unit (98); and switch means (106) being operable for coupling said receiver means (138) to said input means (100) in response to a "connection made" signal coupled thereto from said signal path answering unit (98), and wherein said signal path answering unit (98) comprises:

input means (193) and output means (218), said input means (193) being coupled to said subscriber telephone line (97);

a second telephone set (192) including a transmitter (190), receiver (188) and a switch (194) for selectively coupling said second telephone set transmitter and receiver to said input means (193);

solenoid actuator means (196) coupled to said second telephone set switch (104) for operating said switch from a normally open state to a closed state in response to a control signal applied thereto;

transmitter means (200) and receiver means (202) respectively adapted to be coupled by audio signals to said second telephone set receiver (188) and transmitter (190);

a "connection made" signal generator (224) coupled to said receiver means (202), being normally inoperative but becoming operative when said automatic dialing apparatus (164) in said signal path seizing unit (96) calls said second telephone set (192) and applies a "ring" signal thereto;

a "no ring" signal detector (226) coupled acoustically to said second telephone set (192) and being operative providing a control output signal only in absence of a "ring" signal at said second telephone set;

a "no pilot tone" signal detector (204) adapted to be responsive to signals generated by said "pilot tone" signal generator (141) in said signal path seizing unit (96) and providing a control output in absence of a "pilot tone" input signal thereto;

a "standby" signal generator (216);

switch means (220) responsive to the control output signal of said "no pilot tone" signal detector for coupling the output of said "no ring" signal detector (226) to said "connection made" generator and said solenoid actuator means (196) respectively providing a disabling input signal to said "connection made" signal generator (224) and for operating said actuator means (196) to open said second telephone switch (194); and switch means (208) coupled to said "no ring" signal detector (226) by means of switch means (220) being responsive to the control output signal from said "no ring" signal detector to selectively couple the output of said "standby" signal generator (216) to said output means (218) when said second telephone set switch (194) is open but coupling said "pilot tone" signal generator (141) in said signal path seizing unit (96) via said subscriber telephone line (97) to said "no pilot tone" signal detector (204) when said second telephone set (192) is called as well as additionally coupling said transmitter means (200) to said output means (218) thereby coupling the transmitter means (200) to said subscriber telephone line (97).

* * * * *